(12) United States Patent
Bomer et al.

(10) Patent No.: US 6,810,640 B1
(45) Date of Patent: Nov. 2, 2004

(54) METHODS FOR PRODUCING A COMPOSITE PACKING AND A COMPOSITE PACKING PRODUCED ACCORDING TO SAID METHOD

(75) Inventors: Hans Bomer, Erkrath (DE); Matthias Dammers, Alsdorf (DE)

(73) Assignee: SIG Combibloc GmbH, Linnich (DE)

( * ) Notice: Subject to any disclaimer, the term of this patent is extended or adjusted under 35 U.S.C. 154(b) by 0 days.

(21) Appl. No.: 09/937,163

(22) PCT Filed: Mar. 27, 2000

(86) PCT No.: PCT/EP00/02662

§ 371 (c)(1),
(2), (4) Date: Apr. 12, 2002

(87) PCT Pub. No.: WO00/58079

PCT Pub. Date: Oct. 5, 2000

(30) Foreign Application Priority Data

Mar. 26, 1999 (DE) .......................................... 199 15 150

(51) Int. Cl.[7] .............................................. B65B 61/18
(52) U.S. Cl. ....................... 53/412; 53/133.3; 53/284.5; 53/329.2; 53/565; 493/163; 493/184; 493/102; 156/69; 156/274.4
(58) Field of Search ........................ 53/412, 415, 133.5, 53/133.1, 135.2, 376.6, 478, 133.2, 133.3, 565, 284.5, 296, 329.2; 493/184, 163, 175, 102, 377; 156/69, 274.4

(56) References Cited

U.S. PATENT DOCUMENTS

| | | | | |
|---|---|---|---|---|
| 3,101,879 A | * | 8/1963 | Meyer-Jagenberg | ..... 229/123.3 |
| 3,392,458 A | | 7/1968 | Braun | |
| 3,613,986 A | * | 10/1971 | Christensson | ............ 229/123.1 |
| 4,126,263 A | * | 11/1978 | Martensson | .................. 229/229 |
| 4,239,150 A | | 12/1980 | Schadowski et al. | ..... 229/48 R |
| 4,312,450 A | * | 1/1982 | Reil | ......................... 229/123.1 |
| 4,516,382 A | * | 5/1985 | Nakajima | ................... 53/370.6 |
| 4,581,873 A | | 4/1986 | Knuppertz et al. | ........... 53/373 |
| 4,585,498 A | * | 4/1986 | Lagerstedt et al. | ........... 156/69 |
| 4,631,173 A | | 12/1986 | Muller et al. | .................. 422/28 |
| 4,712,690 A | | 12/1987 | Stohr | ......................... 206/628 |
| 4,798,295 A | * | 1/1989 | Rausing | ...................... 229/229 |

(List continued on next page.)

FOREIGN PATENT DOCUMENTS

| | | |
|---|---|---|
| DE | 12 44 548 | 7/1967 |
| DE | 17 61 315 | 7/1968 |
| DE | 15 11 573 | 10/1969 |
| EP | 0661211 B1 | 7/1994 |
| EP | 0661211 A1 | 7/1994 |
| EP | 0832731 A2 | 9/1997 |
| EP | 0832731 A3 | 9/1997 |
| EP | 0832731 B1 | 9/1997 |
| EP | 0965438 A2 | 6/1999 |
| EP | 0965438 A3 | 6/1999 |
| GB | 1545738 | 11/1977 |
| GB | 2054515 A | 7/1980 |

*Primary Examiner*—Scott A. Smith
*Assistant Examiner*—Thanh Truong
(74) *Attorney, Agent, or Firm*—Standley Law Group LLP (57) ABSTRACT

Methods of producing a laminated package with an opening which is sealed by a tear-off strip or a pouring element as well as a corresponding laminated package are described. To be able to produce a laminated package with such a closure inexpensively, the following steps are provided in the method punching out an opening in a packaging material, coating the packaging material at least in the area of the opening, creating a package sheathing from the coated packaging material, conveying the package sheathing to a filling machine or to an equipment unit from the filling machine, and attaching a tear-open strip to the opening in the package sheathing in the filling machine or in the equipment unit upstream from the filling machine.

1 Claim, 6 Drawing Sheets

U.S. PATENT DOCUMENTS

| | | | | |
|---|---|---|---|---|
| 4,840,270 A | * | 6/1989 | Caputo et al. | 206/205 |
| 4,915,290 A | | 4/1990 | Robichaud et al. | 229/125.08 |
| 4,930,683 A | | 6/1990 | Farber | 229/125.09 |
| 4,934,590 A | | 6/1990 | Robichaud et al. | 229/125.09 |
| 4,986,859 A | * | 1/1991 | Watanabe | 156/69 |
| 5,088,642 A | | 2/1992 | Farber | 229/125.14 |
| 5,101,999 A | | 4/1992 | Robichaud et al. | 220/258 |
| 5,143,281 A | | 9/1992 | Mainz et al. | 229/132 |
| 5,158,633 A | * | 10/1992 | Rausing | 156/223 |
| 5,306,533 A | | 4/1994 | Robichaud et al. | 428/34.2 |
| 5,315,923 A | | 5/1994 | Tokarski et al. | 100/39 |
| 5,660,100 A | | 8/1997 | Spelten et al. | 99/356 |
| 5,782,404 A | | 7/1998 | Robichaud et al. | 229/103.1 |
| 5,832,698 A | | 11/1998 | Huguenin | 53/451 |
| 5,875,958 A | | 3/1999 | Weiteder et al. | 229/125.15 |
| 5,875,959 A | | 3/1999 | Weiteder et al. | 229/125.15 |
| 5,921,293 A | | 7/1999 | Berger et al. | 141/276 |
| 5,924,267 A | | 7/1999 | Bomer et al. | 53/482 |
| 6,145,275 A | * | 11/2000 | Sweeney | 53/412 |

* cited by examiner

METHODS FOR PRODUCING A COMPOSITE PACKING AND A COMPOSITE PACKING PRODUCED ACCORDING TO SAID METHOD

This application is a 371 of PCT/EP00/02662 filed Mar. 27, 2000.

This invention concerns two methods of producing a laminated package, in particular a beverage package, with an opening that is closed by a tear-off strip, as well as a laminated package produced by these methods.

BACKGROUND AND SUMMARY OF THE INVENTION

Liquid products and highly viscous products with lumpy components are offered today to a great extent in laminated packages. There is often a desire on the part of consumers for laminated packages having a simple, manually functioning opening device in particular. Various types of opening and pouring elements are known, such as screw closures, snap closures, adhesive strip closures or tear-off strips. As a rule, the additional expense associated with attaching such opening and pouring elements substantially increases the cost of the respective laminated package.

The object of the present invention is to provide an inexpensive laminated package with an opening closed by a tear-off strip and to provide an inexpensive method of producing such a laminated package.

This object is achieved through the following steps in a first alternative of a generic method:

punching out an opening-in a packaging material, coating the packaging material at least in the area of the opening, creating a package sheathing from the coated packaging material, conveying the package sheathing to a filling machine or to an equipment unit upstream from the filling machine, and attaching a tear-open strip to the opening in the package sheathing in the filling machine or in the equipment unit upstream from the filling machine.

As an alternative, this object is achieved through the following steps:

punching out an opening in a packaging material, coating the packaging material at least in the area of the opening, applying a tear-off strip or a pouring element to the opening in the packaging material in the filling machine or in an equipment unit upstream from the filling machine, creating a package sheathing from the coated packaging material, and conveying the package sheathing to a filling machine or to an equipment unit upstream from the filling machine.

Both of the methods according to this invention are characterized in that punching out the opening in the packaging material and applying the tear-off strip or the pouring element to the opening in the packaging material are performed in a proven manufacturing process using a filling machine in an integrated fashion. Due to the integrated or parallel execution, the required process steps for producing an opening closed by a tear-off strip or by a pouring element are carried out essentially without requiring any additional time and thus inexpensively. No separate applicator for the hole punching, no sealing of an internal label and no sealing of the tear-off strip or the pouring element are necessary.

If the filling machine is equipped with a station for sterilization of the laminated package, the tear-off strip or the pouring element should preferably be attached before the sterilization zone.

In the case of a filling machine with a mandrel wheel for sealing the bottom of prefabricated package sheathing, it is also advantageous if the tear-off strip is mounted on a mandrel of the mandrel wheel. In this case, the mandrel is used as an anvil. This is advantageous in particular when the tear-off strip is attached by ultrasonic welding or high-frequency welding. As an alternative, the tear-off strip may also be attached by gluing.

A favorable possible application for the tear-off strip or the pouring element is also obtained when the package sheathing is fed to the filling machine in such a way that its opening points toward the outside across the working direction of the filling machine.

According to another advantageous embodiment of the method according to this invention, the respective package sheathing may be rotated about its longitudinal axis by approximately 90° between a magazine for accommodating prefabricated package sheathing on the filling machine and the location where the tear-off strip or the pouring element is attached.

Additional advantageous features of the method according to this invention are characterized in the subordinate claims.

BRIEF DESCRIPTION OF THE DRAWINGS

This invention is explained in greater detail below on the basis of a drawing illustrating various embodiments according to a first alternative of the production method according to this invention, showing schematically in detail.

DETAILED DESCRIPTION OF THE PREFERRED EMBODIMENT

Figure 1:
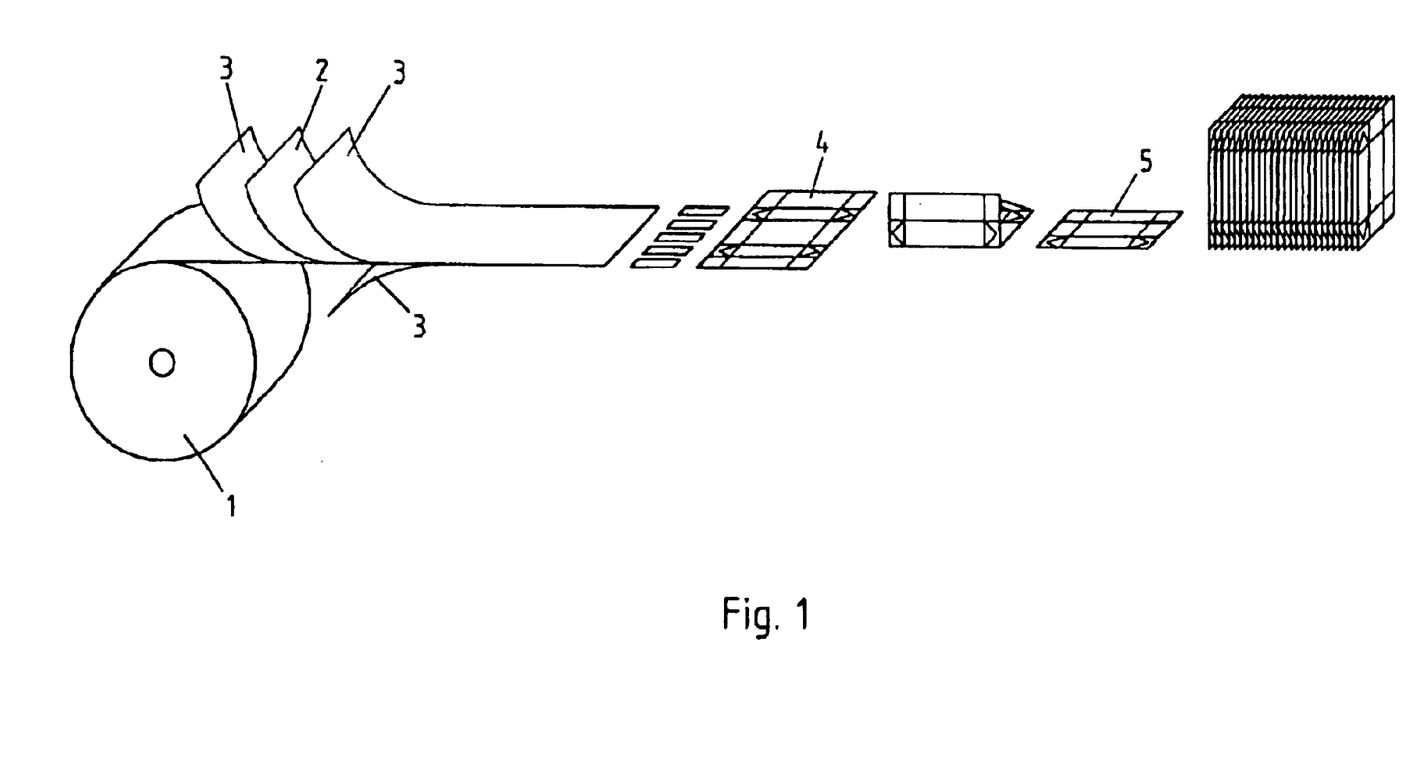
FIG. 1 a diagram of the process steps for production of prefabricated package sheathing.

FIG. 1 shows the process steps for production of package sheathing. The rolled-up cardboard raw material 1 is coated on one side in the traditional manner with a barrier layer 2, preferably aluminum foil, and then is coated on both sides with polyethylene film 3. Before the coating, openings designed preferably as drip holes are punched in the cardboard raw material 1. However, it is also possible for the openings to be punched only after coating the cardboard raw material 1 with polyethylene film on the outside, followed by another coating with aluminum foil and/or polyethylene film. The coated packaging material is then printed and divided into blanks 4 in a punch and also provided with grooves or an edge embossing for folding later to form a cube-shaped package.

The package blanks 4 are then folded to form a package sheathing 5 and sealed along the overlapping longitudinal edges with an airtight and fluid-tight seal. The package sheathing 5 sealed with a longitudinal seam is folded flat and aligned in rows one after the other and joined in a certain number to form shipping cartons or the like.

Such prefabricated package sheathing 5 is then sent to a filling machine which may have two, three or more production lines. The filling machine 6 diagramed in FIG. 2 has two production lines and is equipped with two magazines 7 accordingly. To facilitate the separation of the package sheathings 5, they are subjected to vibration in magazines 7 in a known way and aligned laterally. Sheathings 5 are then removed individually by suction devices from magazines 7, shaped into rectangles and pushed onto a mandrel 8. The filling machine is equipped with two mandrel wheels 9 arranged on a common shaft, each wheel having six mandrels 8 arranged at equal angles.

Figure 2:
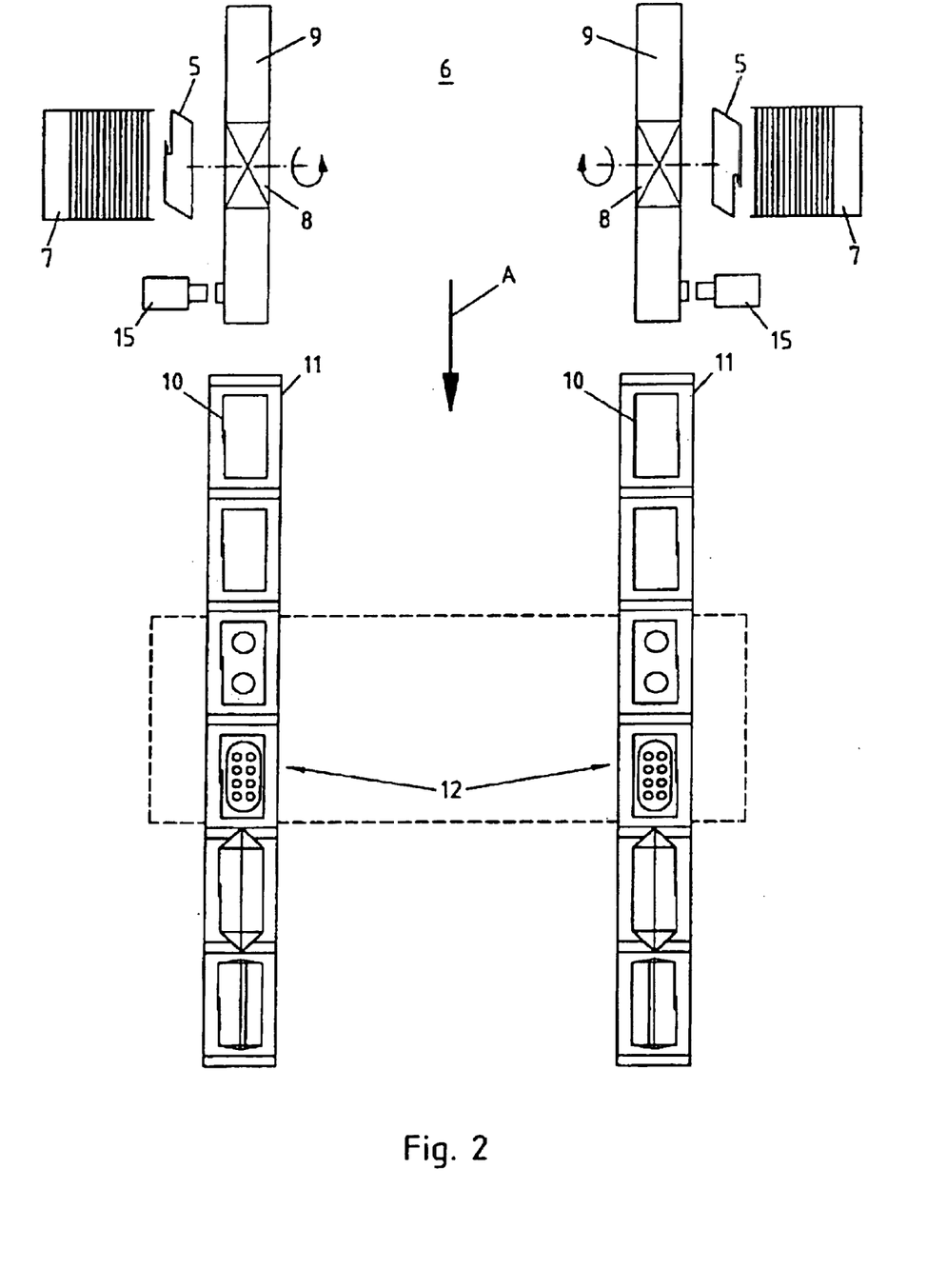
FIG. 2 a diagram of a filling machine with a mandrel wheel for closing and sealing the bottom of prefabricated package sheathing according to FIG. 1.

Various stations which serve to produce the bottom of a package on the respective package sheathing 5 are arranged on the circumference of mandrel wheels 9. First, the areas of the package bottom to be sealed are activated with hot air. While the respective mandrel wheel 9 is conveying the package sheathing 5 further to a bottom pressing station, rotating transverse folding mechanisms and a longitudinal folding mechanism shape the bottom of the package. In the bottom pressing station, the package bottom is then completely pressed and sealed by a bottom pressing stamp on the end face of mandrel 8.

Following this, the package 10 is stripped from the mandrel and pushed into a cell (not further identified) which is designed with a plurality of other cells on a peripheral endless chain 11 and assumes the role of further conveyance through various stations along the chain until they are conveyed away. The arrow A shows the working direction of the filling machine.

One or more stations for sterilization of the package may be arranged along the chain 11 of the filling machine 6 upstream from the filling station 12. Sterilization can be performed preferably by injecting hydrogen peroxide vapor into the packages 10 which are open at the top. Downstream from the filling station 12 are arranged sealing tools which fold the package gable and preferably seal it airtight above the filling level by using ultrasound. The sealing tools are followed by additional folding tools which fold the package gable to form a flat roof. Then the polyethylene is heated with hot air at the gable triangles (so-called "package ears") and along the narrow sides of package 10, the gable triangles are folded down and sealed on the narrow sides of package 10. The finished package is then pushed out of the respective cell into a stacker (not shown) and finally transferred to a delivery device (not shown) in the next machine cycle.

As shown in FIG. 2, the filling machine 6 according to a first embodiment of the method according to this invention may have a device 15 on mandrel wheel 9' with which a tear-off strip can be welded or glued to the layered opening of the package sheathing 5. A second embodiment of the method according to this invention is diagramed schematically in FIG. 3. To allow more time for mounting the tear-off strip in comparison with the method illustrated in FIG. 2, an additional mandrel wheel 9' for mounting the tear-off strip is provided upstream from the mandrel wheel 9 which provides the bottom sealing function of the filling machine 6 in this embodiment. The package sheathing 5 conveyed in stack 16 is in turn removed by suction devices from magazines arranged across working direction A of filling machine 6, shaped into rectangles and pushed onto the respective mandrel 8 of the proposed mandrel wheel 9'. Thus, mounting of the tear-off strip is performed here before the bottom sealing step.

Figure 3:
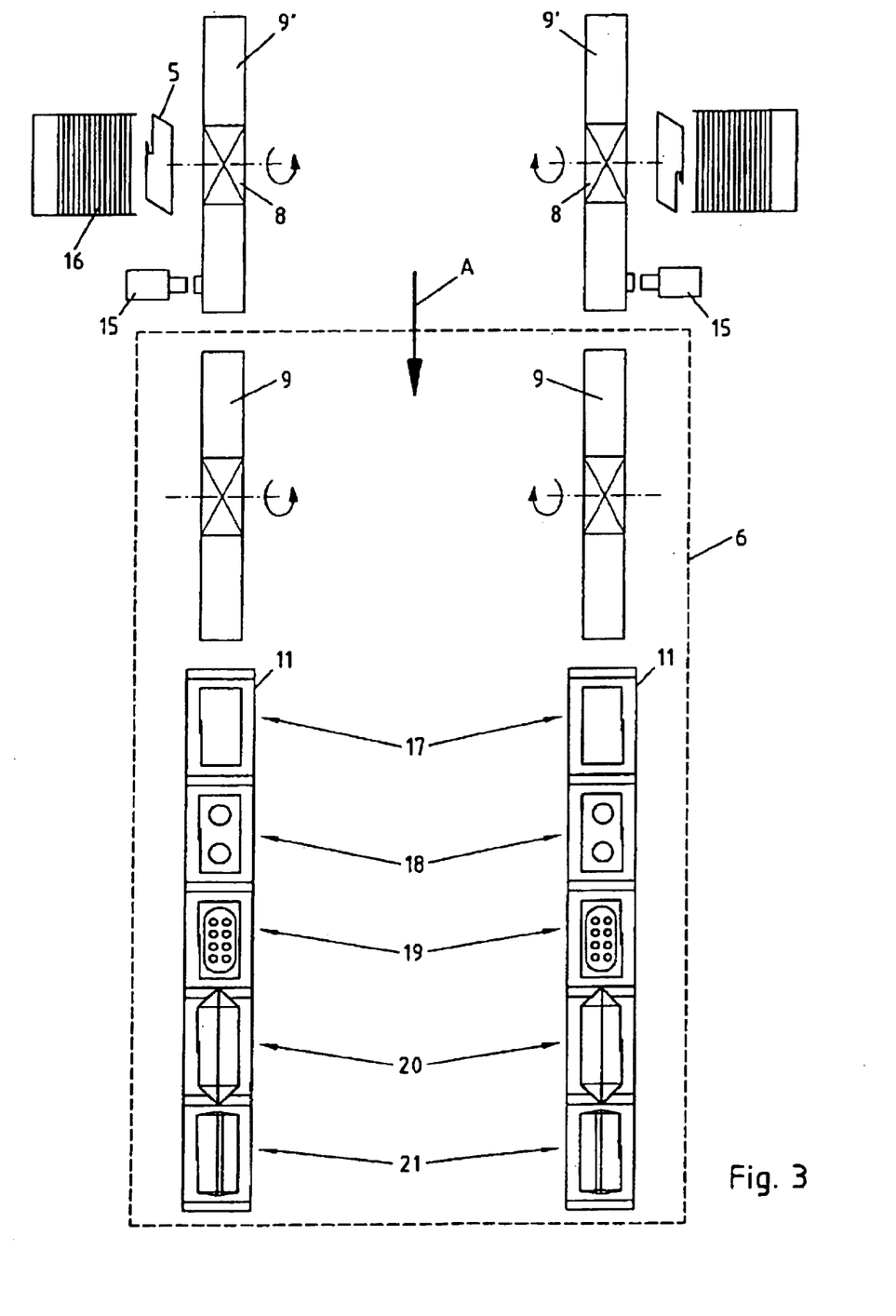
FIG. 3 a diagram of process steps according to this invention on a filling machine, where the tear-off strip is mounted on a mandrel wheel unit upstream from the filling machine.

The longitudinal seam of a cube-shaped laminated package is usually arranged on its broad side, the opening or drip hole in the package is usually arranged next to the longitudinal seam in the area of the package gable, and good accessibility to the opening or drip hole facilitates secure mounting of the tear-off strip, so the mandrels 8 of the mandrel wheels 9, 9' in FIGS. 2 and 3 are each rotated by 90° with respect to those of known filling machines 6. The longitudinal seam of the package sheathing is thus arranged on the axial outside of mandrel wheel 9 or 9' on which the device 15 is arranged for mounting the tear-off strip.

A transfer station 17 is provided with the mandrel wheel 9' in FIG. 3 according to the mandrel wheel 9 in FIG. 2; after the bottom is produced, the package is stripped off from the mandrel at this station and pushed into a cell in the chain 11. The transfer station is followed in working direction A of filling machine 6 by a sterilization station 18, a filling station 19, a gable web seam sealing station 20, a gable shaping station (ear sealing station) 21, a stacker and a delivery device.

Figure 4:
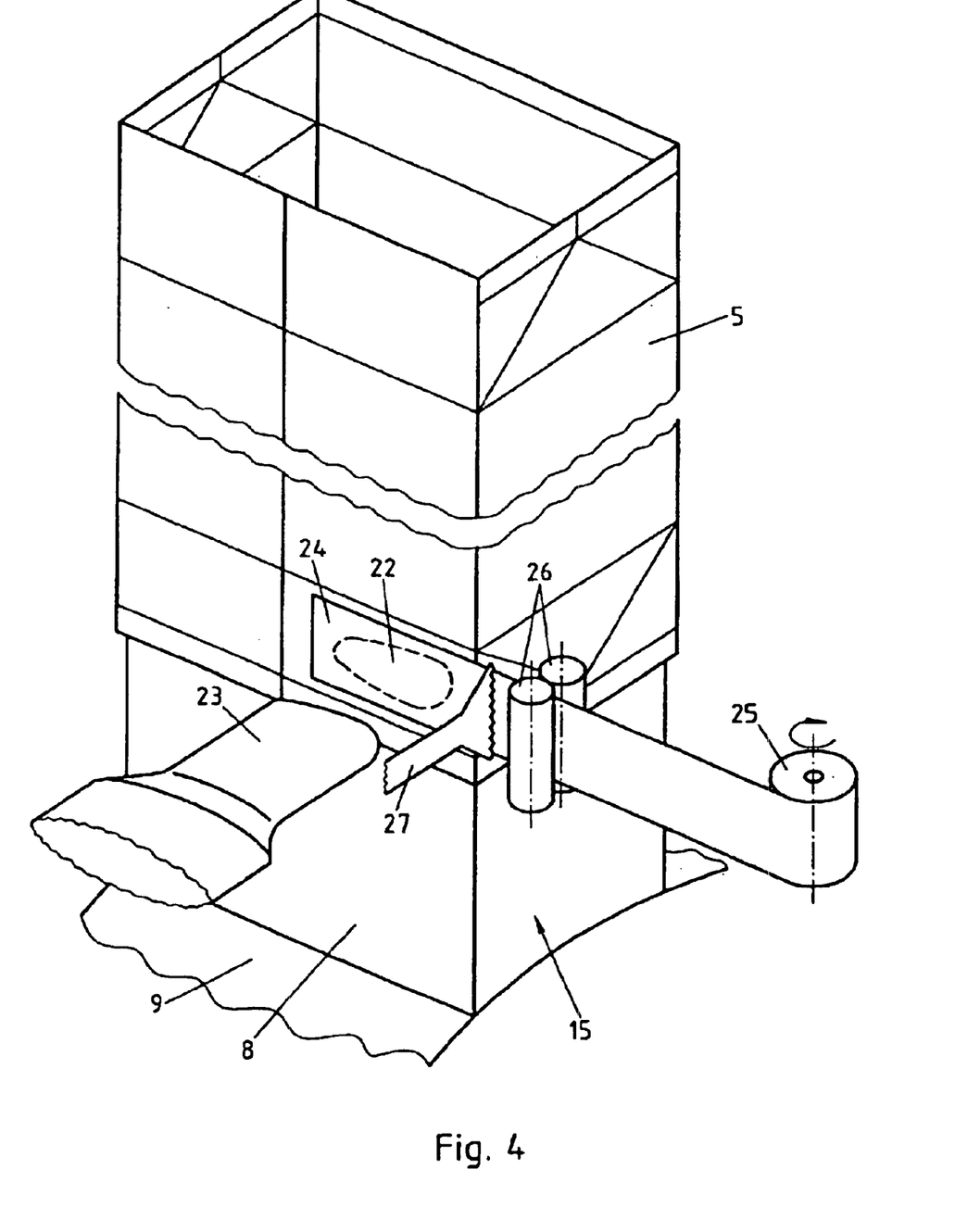
FIG. 4 a perspective diagram of a device for welding a tear-off strip on the mandrel of a mandrel wheel.

FIG. 4 shows a schematic diagram of a device 15 for attaching a tear-off strip to the coated opening 22 of the package sheathing 5. The molded package sheathing is pushed onto a mandrel 8, serving as a mandrel for a sonotrode 23, by means of which a tear-off strip 24, which is preferably made of a tear-resistant, weldable aluminum strip, is welded to the coated opening 22 of the package sheathing 5. For this purpose, the tear-off strip 24 is pulled off from supply roll 25 and supplied to the application station through supply rollers 26 which are arranged in parallel and convey the tear-off strip by frictional engagement. As soon as the tear-off strip 24 which is to be attached is correctly oriented and is bonded securely enough to the package sheathing 5, it is cut off from the supply roll 25 by a cutting device 27. It can be seen that in this case the wide side of the package sheathing 5 with the coated opening 22 points in the direction of rotation of the mandrel wheel 9. The mandrel wheel 9 here is rotated in cycles, and the sonotrode 23 is inserted from the outside between two mandrels during the pauses in movement of mandrel wheel 9 and then is retracted again after welding the sealable tear-off strip 24 to the respective mandrel.

Figure 5:
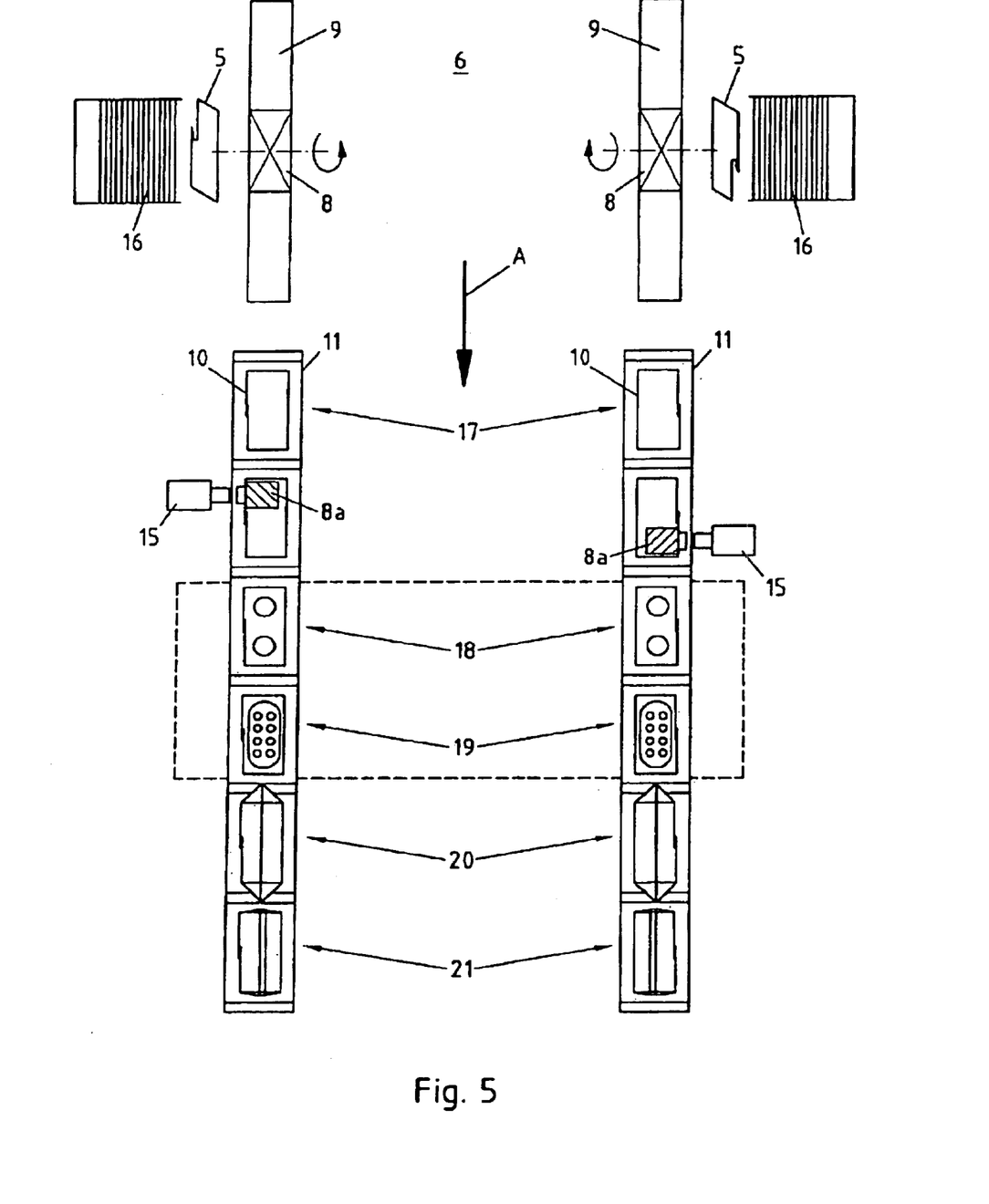
FIG. 5 a diagram of the process steps within a filling machine operating by the method according to this invention as shown in FIG. 2, where the tear-off strip is attached in a chain between the mandrel wheel and an aseptic station.

FIG. 5 shows another embodiment of this invention. In contrast with the embodiments illustrated in FIGS. 2 and 4, the tear-off strip is not applied to the mandrel 8 of a mandrel wheel 9, but instead is applied along the cell chain 11 between the transfer station and the aseptic station 28 by means of a welding or gluing device 15 and an anvil 8a. The package sheathing 5 is again supplied in a stack 16 to the filling machine across its working direction A, so that the coated opening of package sheathing 5 in the chain points outward. The wide sides of the package sheathing 5 or mandrel 8 thus run parallel to the working direction A of the filling machine. The mandrel wheel 9 here serves exclusively as a guide for the package sheathing 5 during the sealing of the bottom. The other stations along the chain 11 correspond to those in FIG. 3.

Figure 6:
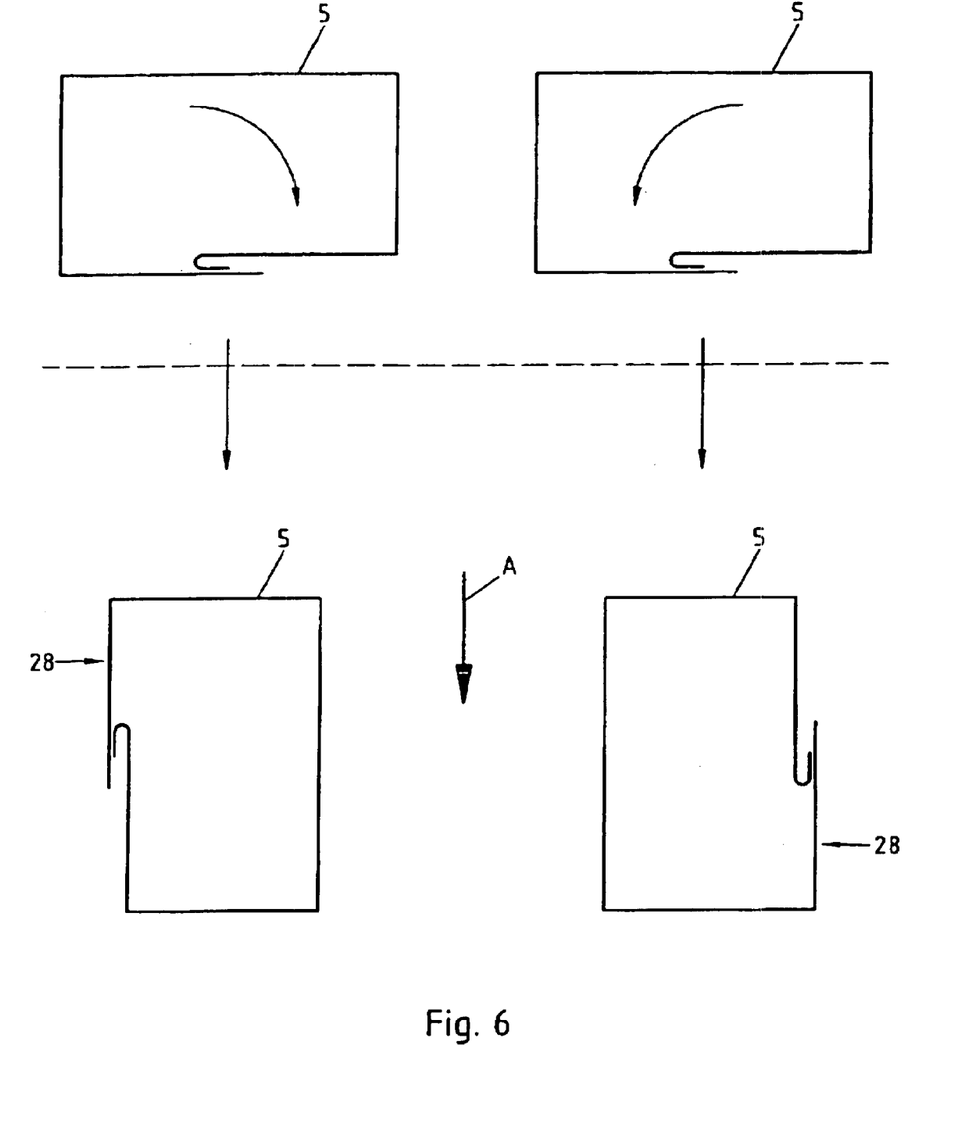
FIG. 6 the rotation of a prefabricated package sheathing within a filling machine for two production lines.

If package sheathings 5 are supplied to the filling machine across the working direction as in the embodiments illustrated in FIGS. 2, 3 and 5, the machine is designed to be relatively broad, because the magazines with the stacks 16 are then arranged across the longitudinal axis of the filling machine. A filling machine with a narrow design can be implemented if the package sheathing 5 is rotated by approximately 90° between the respective magazine 7 and the position where the tear-off strip is attached. This is illustrated in schematic diagrams in FIG. 6 for a filling machine with two production lines, where the arrow A indicates working direction of the machine. It can be seen here that the left package sheathing which is already shaped here is rotated 90° clockwise in the filling machine, while the package sheathing on the right which is also already shaped is rotated counterclockwise by 90°. The different directions of rotation lead to an offset of application sites 28 for the tear-off strips in the production lines. However, both application sites 28 face outward and are thus readily accessible.

What is claimed is:

1. A method of producing a laminated package with an opening that is sealed by a tear-off strip, said method comprising the steps of:

punching out said opening in a packaging material;

coating said packaging material at least in the area of said opening;

creating a package sleeve from said packaging material;

conveying said package sleeve onto a mandrel of a mandrel wheel driven in cycles having at least two mandrels upstream from a filling machine for filling said laminated package; and attaching said tear-off strip to said opening in said package sleeve, wherein said tear-off strip is applied using at least one welding device which is inserted between said two mandrels and is retracted again after said tear-off strip has been welded.

* * * * *